United States Patent [19]
Hooper, Jr.

[11] 3,959,050
[45] May 25, 1975

[54] PLAQUE BOARD WITH POLYURETHANE CORE AND METHOD FOR CONSTRUCTION SAME

[75] Inventor: William A. Hooper, Jr., Kansas City, Mo.

[73] Assignee: John C. Gurche, Overland Park, Kans.

[22] Filed: July 15, 1974

[21] Appl. No.: 488,289

[52] U.S. Cl. .................. 156/79; 428/45; 428/322; 264/46.5
[51] Int. Cl.² ................... B32B 5/18; B32B 1/04
[58] Field of Search ............ 156/79; 428/45, 322; 264/46.5

[56] References Cited
UNITED STATES PATENTS

| | | | |
|---|---|---|---|
| 2,924,861 | 2/1960 | Viets | 264/465.5 X |
| 3,090,078 | 5/1963 | Ackles | 264/46.5 X |
| 3,215,581 | 11/1965 | Carlson et al. | 156/79 X |
| 3,240,846 | 3/1966 | Voelker | 156/79 X |
| 3,560,285 | 2/1971 | Schroter et al. | 156/79 |
| 3,697,633 | 10/1972 | Edgar | 156/79 X |

*Primary Examiner*—Philip Dier
*Attorney, Agent, or Firm*—Lowe, Kokjer, Kircher

[57] ABSTRACT

A plague board comprises a solid polyurethane core enclosed by a high grade wood which forms all exterior surfaces thereof. A wooden frame is secured between the peripheries of a pair of spaced panels formed of flat sheets of veneer. The polyurethane core fills the interior of the frame between the veneer panels and is firmly bonded to the wooden frame and veneer. A method disclosed for constructing the plaque board and other like articles comprises inserting a measured amount of liquid polyurethane foam in the interior space between the attached frame and panels and pressing the opposite veneer panels inwardly as the polyurethane expands outwardly to solidify and become bonded to the frame and panels.

1 Claim, 4 Drawing Figures

PLAQUE BOARD WITH POLYURETHANE CORE AND METHOD FOR CONSTRUCTION SAME

BACKGROUND AND SUMMARY OF THE INVENTION

This invention relates to an improved plaque board and a process for constructing the same and other wooden articles, including such furniture items as tabletops, desktops and the like.

In making various types of articles of a good quality wood such as walnut, the presently existing practice is to cut the wood into strips, provide suitable joints in the strips, and glue the strips together at the joints with the grain reversed in each adjacent strip to achieve the desired appearance. Aside from the obvious cost, time consumption, and workage problems associated with this procedure, the unsightly joints or seams detract from the appearance of the finished article, as does the color variation between the different strips. Also, the cost of an article formed of solid walnut is considerable and its heavy weight creates a problem in certan situations. Walnut and other woods expand and contract due to changes in the moisture content of the air, and a solid wooden article will thus frequently become warped considerably as a result of humidity variations.

Furthermore, a significant quantity of expensive wood is wasted during the construction of many solid wooden articles. For example, when it is desired to make a solid walnut plaque board having a somewhat irregular shape, a square or rectangular piece of solid walnut is cut away at the corners to form the desired shape. The portions of the wood that are cut away are of little utility so they are usually discarded. A similar waste problem exists when a knot or other imperfection must be cut from a solid piece and the relatively large quantity of wood surrounding the imperfection must be thrown away. Sapwood and other soft or inferior portions of the lumber cannot be used because of their appearance and undesirable characteristics.

Although attempts have been made to cover a core of inferior wood with good quality veneer, the results have been unsatisfactory for many of the reasons previously set forth. Additionally, the veneer does not adhere properly to the poor quality wood that forms the core of the article and it eventually peels therefrom, particularly during humidity changes which tend to warp the wood. The problem of adequately securing the veneer to a wooden core is further compounded by the tendency of the veneer to wrinkle due to its extreme thinness. Known processes of securing veneer to a core are inadequate to remove wrinkles from the veneer or resist further wrinkling, and the resulting unsightliness of the veneer and its tendency to peel from the core have presented a serious difficulty.

In view of the afore-mentioned problems, it is the primary goal of the present invention to provide an improved plaque board and method for constructing same, as well as other furniture items and like articles.

More specifically, an object of this invention is to provide a plaque board having an improved appearance. This feature is achieved by forming the opposite sides from thin, high quality veneer which has no joints or seams and which has a better and more consistent color than a solid board comprised of separate strips.

Another object of the invention is to provide a plaque board of the character described that is formed from inexpensive material. Since the bulk of the plaque board consists of a relatively inexpensive core material, only a small amount of high grade wood is required and the cost is thereby substantially reduced. In conjunction with the preceding, it is significant that a limited natural resource is conserved due to the reduced quantity of hardwood required to construct the plaque board.

Yet another object of the invention is to provide a plaque board of the character described that is light in weight yet is of sturdy construction. The provision of a light weight core results in a considerably reduced overall weight compared to that of solid wood, while the rigid core gives the plaque board the strength of a solid member.

A further object of the invention is to provide a plaque board of the character described that is not susceptible to warping or deformation due to humidity variations. The polyurethane core, which is not sensitive to moisture, is bonded to the veneer and frame to provide an integral member which retains its shape and strength during humidity changes.

A still further object of the invention is to provide a novel process for economically constructing a high quality wooden article. Articles such as plaque boards and the like may be quickly and easily manufactured with a minimum amount of equipment since the cumbersome and time consuming process normally associated with making solid wooden articles is eliminated.

A significant feature of the invention is that the waste problem previously set forth is reduced considerably because of the small amount of wood required to construct the article. It is a further significant feature of the construction process disclosed herein that the veneer is moistened by the polyurethane foam and any wrinkles or other irregularities in the veneer panels are removed by pressing the panels inwardly as the foam expands outwardly against their inward surfaces.

Other and further objects of the invention together with the features of novelty appurtenant thereto will appear in the course of the following description.

DETAILED DESCRIPTION

In the accompanying drawing, which forms a part of the specification and is to be read in conjunction therewith, and in which like reference numerals indicate like parts in the various views.

Figure 1:
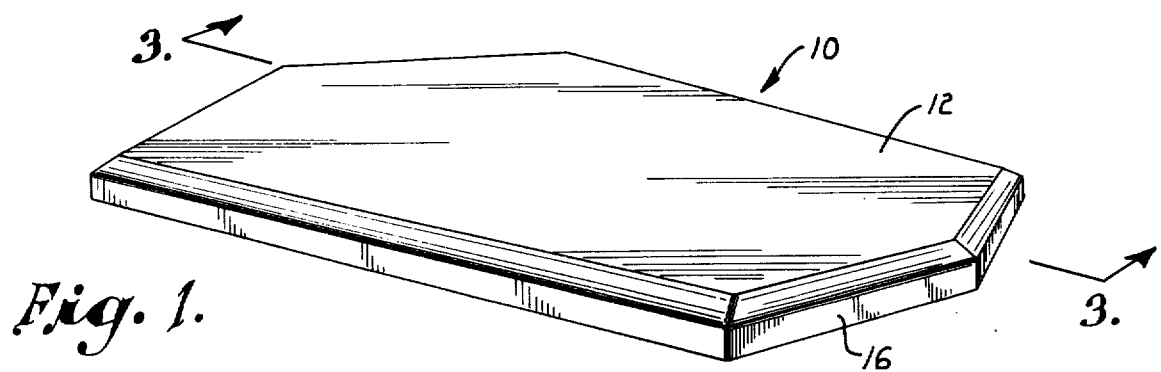
FIG. 1 is a perspective view of a plaque board in the shape of a hexagonal shield which is constructed in accordance with the invention.
Figure 2:
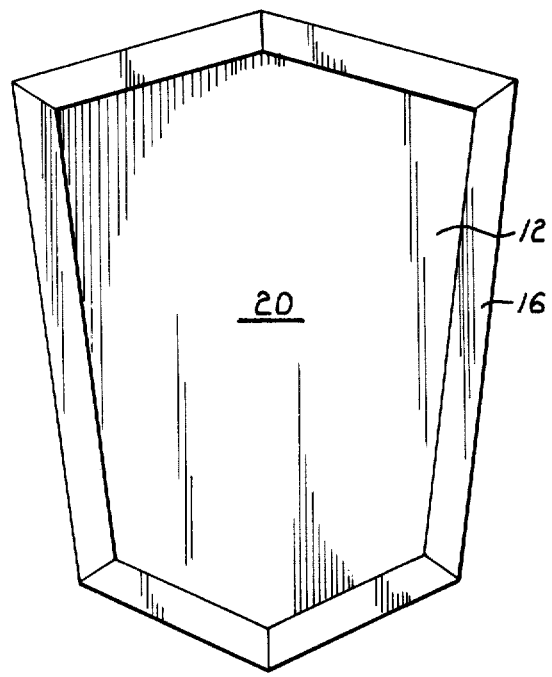
FIG. 2 is a bottom plan view of the plaque board shown in FIG. 1, with the back panel and core removed therefrom.

Referring now to the drawing in detail, an ornamental plaque board formed in a hexagonal shape resembling a shield is generally designated by reference numeral 10. Plaque board 10 comprises generally a hexagonal front panel 12, a hexagonal back panel 14, a wooden frame 16 which interconnects front and back panels 12 and 14 at their peripheries, and a central core 18 which forms the solid interior of the plaque board.

Front panel 12 is in the form of a flat sheet of extremely thin veneer preferably having a thickness of approximately 1/32 of an inch. The veneer is good quality wood such as walnut, and its front or exterior surface may be suitably finished to present a smooth and pleasant appearance. The front panel 12 herein illustrated has a hexagonal periphery to provide it with the appearance of a shield and enhance its visual appeal.

Back panel 14 is also a flat sheet of high grade veneer such as walnut, and its thickness may be approximately the same as that of the front panel 12. The rearward or exposed surface of back panel 14 is preferably finished to enhance its appearance. Back panel 14 has a hexagonal periphery that approximately coincides with the shape of front panel 12, although the back panel is slightly larger than the front panel.

Frame 16 is formed into a continuous structure in the shape of a hexagon to coincide with the peripheral configurations of front and back panels 12 and 14. Six wooden legs have appropriate lengths and flat, angled ends are interconnected end to end (preferably by a high strength glue) to form a continuous, elongate, hexagonal frame structure, which thereby defines a central open space 20 within its interior. Each of the legs included in frame 16 has a flat front side 16a and a flat rear side 16b parallel to front side 16a but of a slightly greater width. The inward surface 16c of the frame extends perpendicularly between the inward edges of sides 16a and 16b. The outward or exposed portion of frame 16 includes a surface 16d extending perpendicularly from the outward edge of rear side 16b and forwardly thereof. A flat angled surface 16e extends inwardly from the front edge of surface 16d to join the outward edge of front side 16a. The only exposed portions of frame 16, surfaces 16d and 16e, are preferably finished walnut, while the remainder of the frame may be sapwood or other inferior wood.

Figure 4:
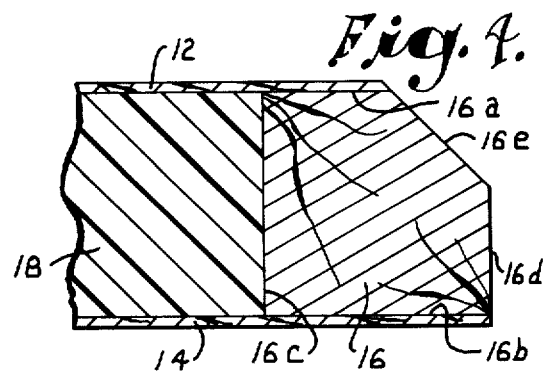
FIG. 4 is an enlarged, fragmentary, cross-sectional view of the right hand portion of the plaque board shown in FIG. 3.
Figure 3:
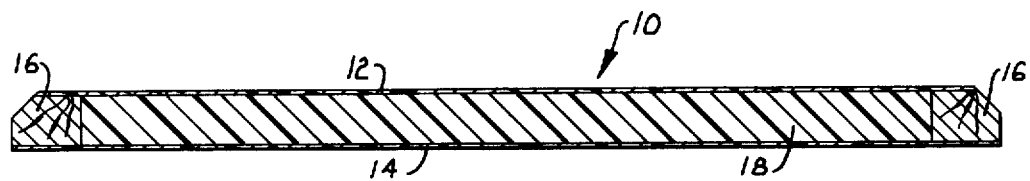
FIG. 3 is a cross sectional side view of the plaque board taken generally along line 303 of FIG. 1 in the direction of the arrows.

Frame 16 is secured between the respective peripheries of the front and back panels with its flat front side 16a fixed (preferably by glue) to the rear surface of the front panel 12 to extend continuously and adjacently along the hexagonal periphery thereof. The flat rear side 16b of the frame is fixed (again, preferably by glue) to the front or inward surface of back panel 14 to extend continuously and adjacently along the hexagonal periphery thereof. As is best illustrated in FIG. 4, the relative shapes and sizes of front panel 12, rear panel 14, and frame 16 are such that the hexagonal periphery of front panel 12 is secured adjacently forwardly of frame surface 16e, while the hexagonal periphery of back panel 14 is secured adjacently rearwardly of frame surface 16d. The height of frame side 16c (which defines the depth of frame 16) is uniform throughout the length of the frame and is much greater than the combined thickness of panels 12 and 14 to thereby space the front and back veneer panels in a parallel relationship a considerable distance apart compared to their thickness. Frame 16 need only to be wide enough to provide adequate strength to the assembled plaque board 10, although it is preferred that the width of the frame is approximately equal to its depth, as is best shown in FIG. 4.

Core 18 is a solid, rigid substance which completely fills the open area 20 interiorly of frame 16 and between front and back panels 12 and 14. It is noted that the volume of core 18 is considerably greater than the total quantity of wood used in panels 12 and 14 and frame 16. Core 18 is preferably somewhat lighter in weight than the wood which forms the remainder of the plaque board and the core may conveniently be a foam that is introduced in liquid form and thereafter expands, solidifies, and becomes bonded to the surrounding wood members. I have found that a particularly well-suited substance for forming core 18 is polyurethane foam. A measured quantity of polyurethane foam expands considerably from its liquid form to finally solidify into a rigid, high strength material having a volume which is known from the quantity of liquid introduced. The predictable expansion ratio of the foam simplifies the manufacturing process, as will hereinafter be described in more detail. Polyurethane also adheres to wood to provide good bonding characteristics, and it does not expand or contract appreciably with temperature and humidity variations as do many other substances.

To construct plaque board 10, the front panel 12, back panel 14, and frame 16 are first formed in the aforesaid configurations. Frame 16 is then secured to front panel 12 at the described location thereon by gluing the flat side 16a of the frame to the peripheral region of the rear surface of the front panel 12. When the attached front panel and frame are thereafter placed in an inverted position with the front surface of the panel 12 facing downwardly, the formation of core 18 may begin by inserting the core substance in the interior space 20, which is bounded at the bottom by front panel 12 and at the sides by frame 16 to contain the core material inserted therein.

As previously set forth, the core material is preferably polyurethane foam. A measured quantity of the foam is inserted in liquid form into the bounded space 20. I prefer to use a foam that expands to approximately 30 times its liquid volume upon solidifying and which has a density of approximately 6 to 12 pounds per cubic foot. Since the expansion ratio of the foam is known and the volume of the core may be calculated, the precise amount of foam that will completely fill the core volume upon expanding may be readily determined. The inserted polyurethane foam immediately begins expanding to fill the core, and it also becomes bonded to frame 16 and front panel 12 upon contact therewith.

Immediately after inserting the polyurethane foam liquid in the core area, back panel 12 is secured to frame 16 in the described position by gluing the peripheral region of the forward or inward surface of back panel 14 to the flat rear surface 16d of the frame. Core 18 is then completely enclosed by front and rear panels 12 and 14 and frame 16.

The assembled plaque is immediately thereafter placed in a press while the polyurethane foam is still expanding. The press in which the plaque is placed may be any of several well known types which include a pair of flat, parallel metal plates which are of greater area than the front and back panels 12 and 14. The respective press plates lie flat upon front panel 12 and back panel 14 and are pressed toward one another to exert a predetermined inward force on the front and back panels of the plaque board. The inward force of the press should be greater than the outward force exerted on panels 12 and 14 by the expanding polyurethane foam so that the press plates retain the two back panels in a flat condition as the expanding foam presses outwardly therefrom. I have found that the use of foam which exerts an outward pressure of approximately 10 pounds per square inch as it expands and a press which exerts a constant inward pressure of approximately 20 pounds per square inch will effectively retain the veneer panels 12 and 14 in a perfectly flat form as the polyurethane solidifies. In this connection it is noted that polyurethane is particularly advantageous as the core material because it transfers enough of its moisture to the front and back panels to soften the veneer and thereby aid in removing any wrinkles or other imperfections in the veneer as the force of the press flattens the front and rear surfaces of the plaque board.

When the polyurethane has completely solidified to form a strong, rigid core which is bonded to the veneer panels 12 and 14 and frame 16, the integral plaque board 10 is removed from the press and its exposed surfaces may be finished as desired to give the plaque board the appearance of a solid wood member having no joints or seams. Because the relatively light weight polyurethane core forms the bulk of plaque board 10, the plaque board is considerably reduced in weight compared to a solid board of the same size. Core 18 is bonded to all of the wood members to provide substantial strength, as well as oppose any tendency of the wood to warp or wrinkle as the humidity varies or stress is exerted thereon.

It should be understood that the process described herein for assembling plaque board 10 is equally applicable and useful in constructing numerous articles such as various furniture items including, but not limited to, tabletops, desktops, and the like.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:
1. A method of constructing a unitary article, such as a plaque board, having only wooden surfaces exposed, said method comprising the steps of:
   providing first and second wooden veneer sheets;
   constructing a continuous, endless, all wooden frame having an open interior completely bounded by said frame, said frame having a preselected shape and an exposed exterior surface extending continuously thereon, said exterior surface including first and second portions joined together in angled relation;
   securing said frame directly against said first veneer sheet to locate said first veneer sheet in position to close one side of said frame interior and to locate said frame in position to form a continuous peripheral border having said first and second surface portions exposed;
   inserting a liquid foam substance within said frame interior and against said first veneer sheet, said foam substance being adapted to expand, solidify, and become bonded directly to said veneer sheets and frame;
   securing said second veneer sheet directly to said frame in spaced relation from said first veneer sheet after the insertion of said foam substance but prior to the completion of the expansion and solidification of said foam substance, said second veneer sheet thereby closing the other side of said frame interior to cooperate with said first veneer sheet and frame to completely enclose said foam substance within said frame interior; and
   pressing and holding said first and second veneer sheets tightly against said frame as said foam substance expands to fill said frame interior and press outwardly directly against said veneer sheets and frame, whereby said foam substance becomes bonded to said veneer sheets and frame as it solidifies to form a rigid core completely internally of said frame interior.

* * * * *